United States Patent
Uphus

(10) Patent No.: US 7,350,959 B2
(45) Date of Patent: *Apr. 1, 2008

(54) PIN EXTRUDER WITH GEAR PUMP

(75) Inventor: Reinhard Uphus, Hannover (DE)

(73) Assignee: VMI-AZ Extrusion GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/546,934

(22) Filed: Oct. 12, 2006

(65) Prior Publication Data

US 2007/0104815 A1    May 10, 2007

(30) Foreign Application Priority Data

Oct. 12, 2005  (DE) .................. 10 2005 048 847

(51) Int. Cl.
*B29B 7/44* (2006.01)
*B29C 47/64* (2006.01)

(52) U.S. Cl. .................. 366/77; 366/80; 366/81

(58) Field of Classification Search ............ 366/77, 366/79, 80–85, 301, 318–324; 425/204, 425/208, 209
See application file for complete search history.

(56) References Cited

U.S. PATENT DOCUMENTS

| | | | | |
|---|---|---|---|---|
| RE26,147 E | * | 1/1967 | Parshall et al. ............ | 366/80 |
| 3,487,503 A | * | 1/1970 | Barr et al. ................ | 425/208 |
| 3,751,015 A | * | 8/1973 | Hensen et al. ............. | 366/81 |
| 4,491,417 A | * | 1/1985 | Hold et al. ................ | 366/90 |
| 5,108,711 A | * | 4/1992 | Chszaniecki ............... | 366/83 |
| 5,267,847 A | * | 12/1993 | Bohm et al. ............... | 366/77 |
| 6,241,375 B1 | * | 6/2001 | Wang ....................... | 366/82 |
| 6,709,147 B1 | * | 3/2004 | Rauwendaal ............... | 366/80 |
| 2007/0097782 A1 | * | 5/2007 | Uphus ...................... | 366/80 |
| 2007/0104815 A1 | * | 5/2007 | Uphus | |

FOREIGN PATENT DOCUMENTS

| | | | |
|---|---|---|---|
| DE | 3139024 A1 | * | 5/1982 |
| DE | 3150757 A1 | * | 7/1982 |
| EP | 0069271 A2 | * | 1/1983 |
| JP | 62-167025 | * | 7/1987 |

* cited by examiner

*Primary Examiner*—Charles E. Cooley
(74) *Attorney, Agent, or Firm*—Robert W. Becker; Robert W. Becker & Assoc.

(57) ABSTRACT

A conveying apparatus comprising an extruder having a housing, a gear pump connected to the extruder, an extruder cylinder rotatably mounted in the housing, and a plurality of pins extending radially outwardly from the extruder cylinder. The extruder housing is provided with helical conveyor paths and openings for the pins.

20 Claims, 3 Drawing Sheets

PIN EXTRUDER WITH GEAR PUMP

This specification for the instant application should be granted the priority date of Oct. 12, 2005, the filing date of the corresponding German patent application 10 2005 048 847.1.

The invention relates to a conveyor device or conveying apparatus.

BACKGROUND OF THE INVENTION

The invention relates to a conveyor device or conveying apparatus pursuant to the introductory portion of claim 1.

Such conveying apparatus have been known for some time. They are provided, as essential elements, with an extruder and a gear pump that is connected to the extruder, either directly or indirectly; the gear pumps are frequently embodied as planetary pumps. Due to the effect of the extruder, a very high conveying capacity can be provided for, and the planetary pump enables the realization of a high and also uniform output pressure.

If polymeric material such as rubber or the like is to be conveyed with the conveying apparatus, it is essential that the material that is to be conveyed be homogenized. Frequently, at least portions of the material are still cold or highly viscous. However, it is just such cold islands that tend to remain inhomogeneous, since they practically do not intermix with the remaining material. To compensate for this, it is known to equip the extruder with a so-called transfer mix zone, where the extruded material is better intermixed, but at the cost or sacrifice of the conveying capacity.

Furthermore, various measures have been proposed to improve the intermixing with a combination of an extruder and a gear pump. For example, with the approach of U.S. Pat. No. 4,642,040, an inclined channel is provided between extruder and gear pump. A further solution is disclosed in DE-PS 103 48 985. With this gear pump, a transfer mix zone having a thread depth that increases toward the gear pump is provided. Although this approach permits a relatively good conveying capacity at high pressure, it would nonetheless be desirable to further improve the mixture even with different starting materials.

It is therefore an object of the present invention to provide a conveying apparatus with which can be expected and improved throughput at high pressure even with starting materials that are different and are present in an inhomogeneous state.

SUMMARY OF THE INVENTION

This object is inventively realized by a conveying apparatus comprising an extruder having a housing, a gear pump connected to the extruder, an extruder cylinder rotatably mounted in the housing, and a plurality of pins extending radially outwardly from the extruder cylinder, wherein the extruder housing is provided with helical conveyor paths and openings for the pins.

The inventive solution is characterized by the combination of a known gear pump with an extruder that is embodied in a special manner: instead of an extruder screw, pursuant to the invention an extruder cylinder is provided that has a plurality of pins that extend radially outwardly. Pursuant to the invention, the extruder has helical conveyor paths and openings for the pins. Since the extruder cylinder is cylindrical, the conveying of material is effected entirely radially beyond or externally of the extruder cylinder, whereby a surprisingly good conveying effect paired with a particularly good intermixing effect results. A special transfer portion is not needed, so that to this extent no pressure loss results.

Pursuant to the invention, it is particularly expedient if the openings are provided in conveyor ribs in the extruder housing and are dimensioned such that upon rotation of the extruder cylinder the pins can just pass through them. The homogenization effect results in particular on the downstream side flank of the opening, because at this location the material that is to be homogenized is split into a portion that is inclined axially and a portion that in the tangential direction is initially carried along. In so doing, there surprisingly results an automatic compensation of the inhomogeneity: if the rubber mass temperature is low, a relatively high viscosity results, so that the conveying effect, the shearing effect, and due to the friction the increase in temperature are then greater. With this approach, relatively cold rubber zones are rapidly split and accordingly heated up, whereas the fine homogenization of the already more liquid material can be effected with less stressing of the material.

It is also particularly expedient that the inventive configuration of the extruder with an extruder cylinder and conveyor paths in the extruder housing, whereby additionally pins rotate in the circumferential direction and openings is particularly compatible to planetary pumps, wherein stationary planetary gears are used: the orientation of the conveyor ribs relative to the planetary gears can be selected such that the transition is effected in an essentially flush manner, and in particular on the conveying side of the conveyor ribs. In conjunction therewith, it is particularly expedient if the number of conveyor ribs coincides with the number of planetary gears or is an integral multiple thereof, in order to this extent to ensure a uniform introduction of the material that is to be extruded to the gear pump.

It is furthermore to be understood that any suitable type of gear pump can be used. This includes known helically geared planetary pumps and also, for example, gear pumps having two contra rotating gear reels.

Pursuant to an advantageous embodiment, an extruder cylinder is rotatably mounted in the extruder housing, a plurality of pins extend radially outwardly from the extruder housing, and the extruder housing is provided with helical conveyor paths as well as openings for the pins.

Pursuant to a particularly advantageous embodiment, the extruder cylinder is connected with an extruder screw that has conveyor paths via which material that is to be conveyed is supplied to the extruder cylinder.

Pursuant to a particularly advantageous embodiment, the conveyor paths in the extruder housing have a pitch of less than two, especially approximately 0.8 to 1.6, and preferably approximately 1.2.

Pursuant to a particularly advantageous embodiment, the pins of the extruder cylinder respectively extend in a plane and are symmetrically distributed within this plane, whereby in particular 4, 6 or 8 pins are arranged per plane.

Pursuant to a particularly advantageous embodiment, the pins respectively have a circular cross-section section and a length-to-diameter ratio of 0.5 to 2, preferably approximately 1.

Pursuant to a particularly advantageous embodiment, the pins extend through essentially the entire radial extension of the conveyor paths and end just, in particular approximately 5 to 10%, before the wall of the extruder housing, relative to the radial height of the conveyor paths.

Pursuant to a particularly advantageous embodiment, a plurality, in particular 2 to 20, preferably 3 to 12, and especially preferred 4 to 8, planes of pins are disposed in an axially successive manner.

Pursuant to a particularly advantageous embodiment, an equal number of pins is arranged on each pin plane, and in particular preferably oriented axially relative to one another.

Pursuant to a particularly advantageous embodiment, the same number of pins is arranged on each plane, whereby the pins are axially offset relative to one another.

Pursuant to a particularly advantageous embodiment, the pins are arranged in a plurality of pin planes, and at least two pin planes have different numbers of pins.

Pursuant to a particularly advantageous embodiment, the arrangement of the pin planes is selected such that the openings in the helical conveyor paths respectively have pins pass through at different points in time.

Pursuant to a particularly advantageous embodiment, the openings respectively have a diameter, as viewed in the circumferential direction, that is 2 to 10%, preferably approximately 4%, greater than the diameter of the pertaining pin.

Pursuant to a particularly advantageous embodiment, each opening has two opening side walls that delimit the conveyor ribs of the helical conveyor paths, and the side walls extend parallel to the direction of rotation of the extruder screw.

Pursuant to a particularly advantageous embodiment, the planetary gears are arranged in a fixed manner and are rotatable by means of a sun wheel that is connects with the extruder cylinder so as to rotate therewith, and in particular is monolithic therewith.

Pursuant to a particularly advantageous embodiment, the gear pump (30) is capable of being driven separately from the extruder cylinder (14).

Pursuant to a particularly advantageous embodiment, the conveyor ribs of the extruder housing are adjacent to the gear pump and are flush with the planetary gears.

Pursuant to a particularly advantageous embodiment, the number of planetary gears and the number of conveyor ribs are an integral multiple of one another, and in particular are equal to one another.

BRIEF DESCRIPTION OF THE DRAWINGS

Further advantages, details and features are provided from the following description of an embodiment with the aid of the drawings, in which.

DESCRIPTION OF SPECIFIC EMBODIMENTS

Figure 1:
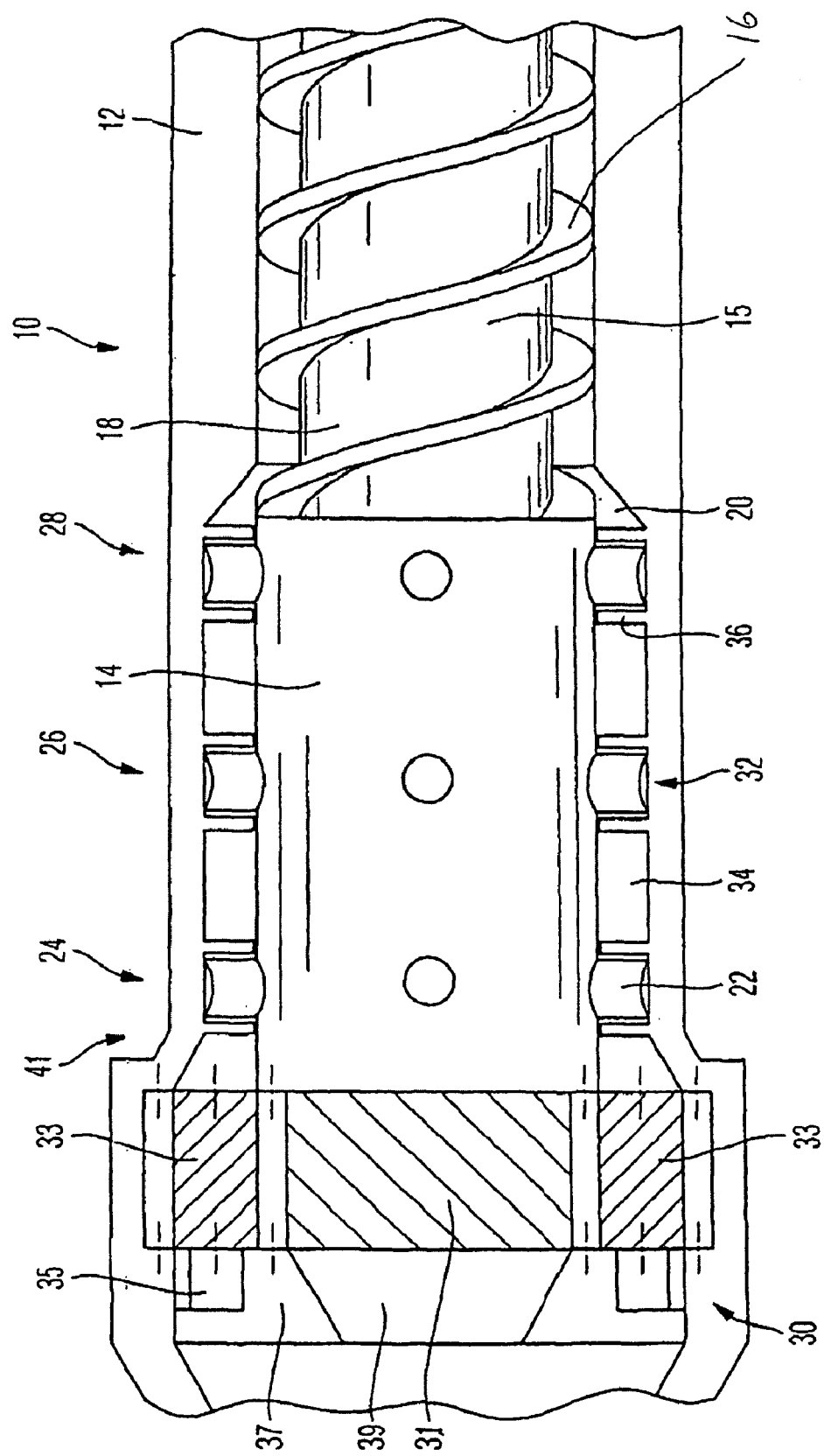
FIG. 1 is a schematic view of one embodiment of an inventive conveying apparatus.

The conveying apparatus 10 illustrated in FIG. 1 has an extruder housing 12 and an extruder cylinder 14. The extruder cylinder 14 is monolithically connected with an extruder screw 15, which extends upstream of the extruder cylinder 14. In this region, through which the material that is to be extruded first passes, the extruder screw 15, in a known manner, has helical screw ribs 16 and between them similarly helically extending grooves or conveying paths 18. There, the extruder housing is embodied as a known hollow cylinder having smooth inner surfaces.

Following this region, there extends an expansion region 20 that enables an increase in diameter to the inventively embodied region of the conveying apparatus 10.

Even though here the invention is described as a combination of the extruder cylinder 14 with an extruder screw 15, it is to be understood that instead it is also possible to eliminate the extruder screw 15.

In the region of the extruder cylinder 14, the extruder cylinder is embodied in the manner of an outside cylinder. The diameter of the extruder cylinder 14 coincides with the inner diameter of the conveyor or extruder housing in the region of the extruder screw 15.

Pursuant to the invention, a plurality of pins 22 extend outwardly from the extruder cylinder 14. The pins 22 extend in the pin planes 24, 26 and 28, and in particular respectively in openings 32. The openings 32 extend through or interrupt conveyor ribs 36, which extend in a helical manner, and in particular as a continuation of the screw ribs 16, whereby correspondingly formed conveyor paths 34 extend between the conveyor ribs 36.

In the angle of the rotation of the extruder cylinder 14 illustrated in FIG. 1, the pins 22 respectively extend through the openings 32. In reality, the distribution of the pin arrangement can preferably be undertaken such that not all of the pins extend through the openings at the same time, but rather at different points in time. This can easily be realized by an appropriate angle offset and makes it possible to reduce or avoid pulsations by a uniform application of pressure.

Whereas in FIG. 1 all of the openings are illustrated as being uniform, it is inventively expedient if the pins have different shapes, whereby for example the pins of the pin plane 28 can have a larger cross-sectional configuration than that illustrated.

It is to be understood that the widths of the openings 32 are respectively adapted to the pins 22. The width of each opening 32 as viewed in the illustration of FIG. 1 is preferably respectively slightly greater than the axial diameter of the pertaining pin 22.

Pursuant to the invention, adjacent to the region of the extruder cylinder 14 is the inventive gear pump 30. The gear pump is embodied as a planetary pump in a known manner, and has a sun wheel 31 that meshes with planetary gears 33. The planetary gears 33 are connected with the housing 12 so as to rotate therewith via bearings 35. The sun wheel 31 is similarly supported on the housing 12 via stays or struts 37 of a central bearing 39, so that to this extent also at the same time a support of the inventive extruder cylinder 14 results, which is preferably monolithic with the sun wheel 31.

It is to be understood that the diameter of the individual gears of the gear pump 30 can be adapted over wide ranges to the requirements.

For example, the diameter of the planetary gears 33 can be selected in conformity with the height of the conveyor paths 34. In the illustrated embodiment, the diameter is, however, somewhat greater, so that a further expansion region 41 is provided in which the conveyor paths 34 extend radially outwardly somewhat further. In a known manner, the planetary gears 33 and the sun wheel 31 have the conventional helical gearing. The planetary gears are aligned relative to the conveyor ribs.

Figure 2:
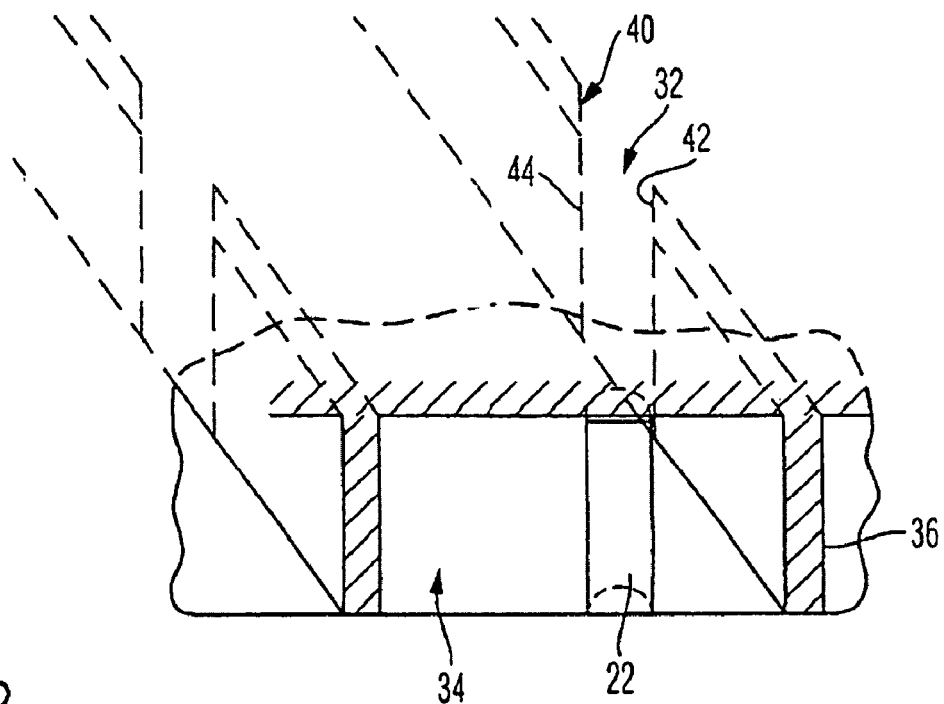
FIG. 2 shows the conveying apparatus of FIG. 1, whereby a portion, namely the portion of the extruder cylinder with the extruder housing surrounding it, is illustrated as a development.

FIG. 2 shows the development of a portion of a pin arrangement pursuant to FIG. 1. There, as also in the other figures, the same reference numerals are used for the same parts.

As can be seen, the pin 22 moves in the circumferential direction, as viewed in FIG. 2, such that it passes precisely through the opening 32 in the conveyor rib 36. For this purpose, the opening 32 has a suitable configuration, so that opening side walls or flanks 42 and 44 result that extend parallel to the circumferential direction and accordingly are respectively inclined relative to the main direction of the conveyor rib 36. The inclined position angle is a function of the pitch of the conveyor path 34 or the conveyor rib 36.

When the pin 22 passes through the opening there laterally results a gap. Pursuant to the invention, this gap is very small. For example, it can be about 5% of the diameter of the pin.

At the acute front or leading edge 44 of the conveyor rib 36, facing the opening 32, the material that is carried along by the pin is in practice split into a first portion that passes through the opening 32, and a larger portion that is deflected in the direction of the conveyor path 34 and hence is conveyed.

Surprisingly, in this way it is possible to achieve a particularly great conveying capacity, whereby it is to be understood that also the shape of the pin can be selected in any desirable suitable manner in order to improve the conveying effect in a direction of the conveyor paths.

For example, the pin shape can be selected in the manner of a rhombus, so that the inclined side flank of the pin that faces the conveyor path 36 pushes the extruded material practically laterally at an angle into the conveyor path.

Figure 3:
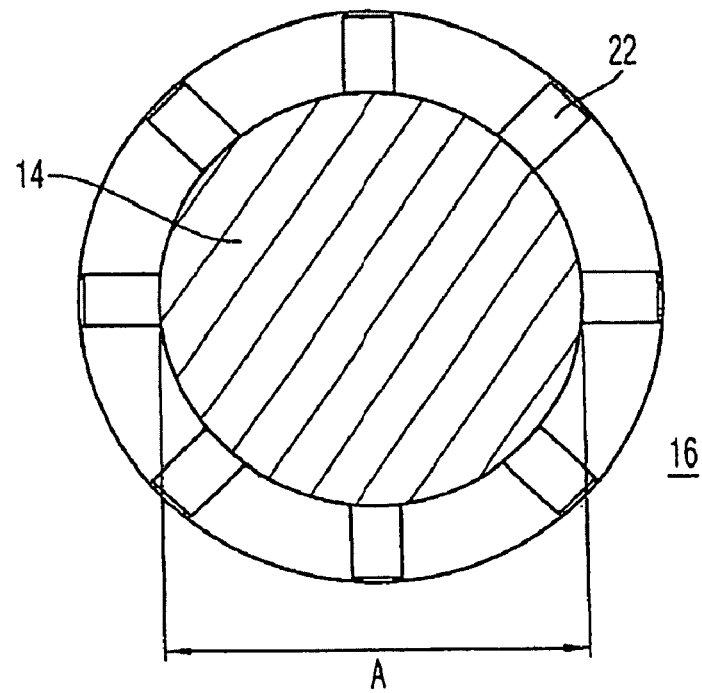
FIG. 3 is a cross-sectional view through the extruder.

From FIG. 3 it can be seen that the pins 22 can be distributed symmetrically and uniformly about the periphery of the extruder cylinder 14. Here a total of eight pins assume a portion of the conveying surface. The greater the number of pins, the greater is the conveying effect, but on the other hand the less is the through-flow surface, which again limits the throughput. An adaptation to the requirements can be undertaken over a wide range.

Figure 4:
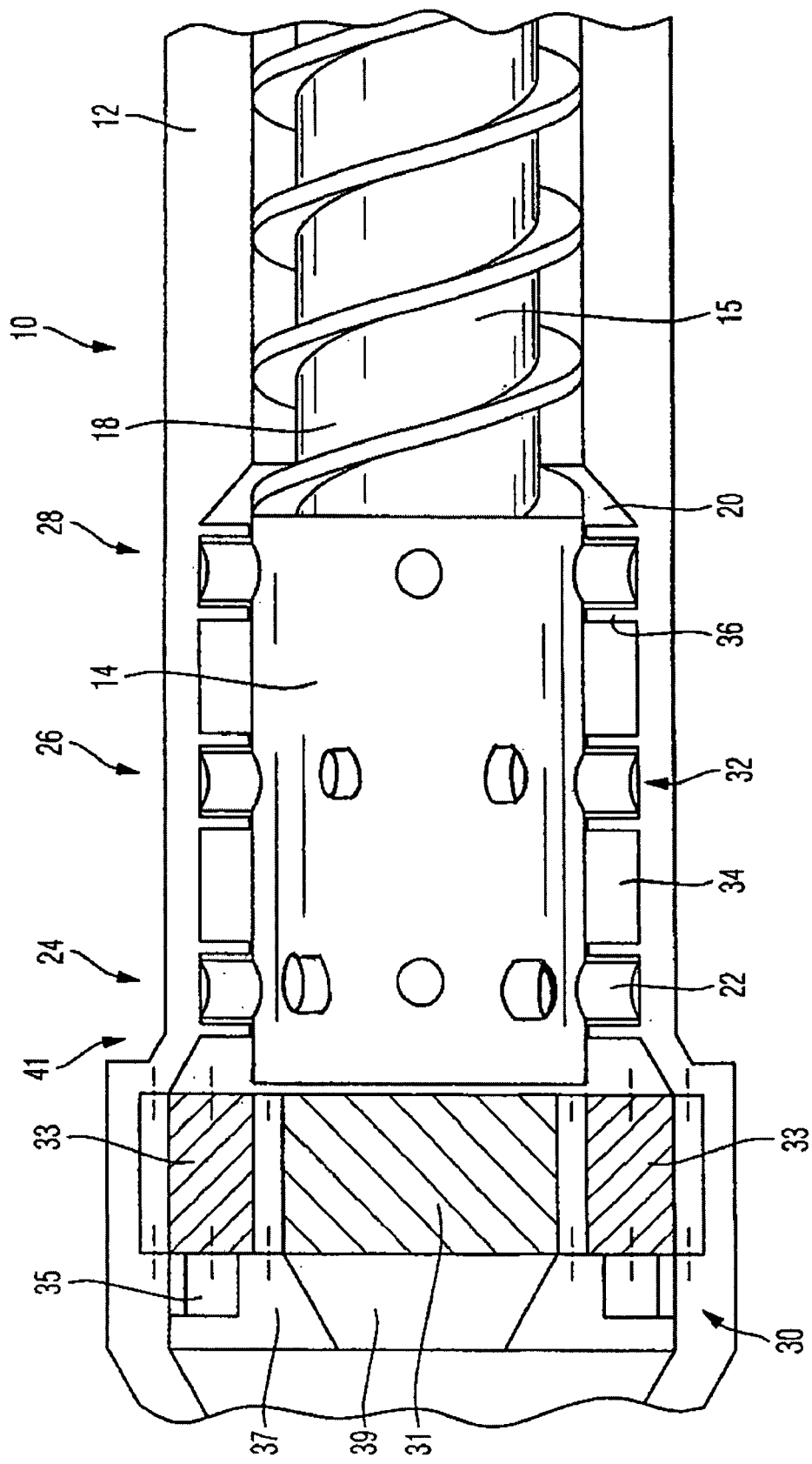
FIG. 4 is a schematic view of another embodiment of an inventive conveying device.

The schematic illustration of FIG. 4 shows an alternative embodiment where the number of pins 22 differs in the pin planes 24, 26 and 28.

The invention claimed is:

1. A conveying apparatus comprising:
   an extruder having a housing;
   a gear pump connected to said extruder;
   an extruder cylinder rotatably mounted in said extruder housing; and
   a plurality of pins extending radially outwardly from said extruder cylinder, wherein said extruder housing is provided with helical conveyor paths and openings for said pins.

2. A conveying apparatus according to claim 1, wherein said extruder cylinder is connected to an extruder screw that is provided with conveyor paths, via which the material that is to be conveyed is adapted to be supplied to said extruder cylinder.

3. A conveying apparatus according to claim 1, wherein said conveyor paths in said extruder housing have a pitch of less than 2, in particular approximately 0.8 to 1.6, preferably approximately 1.2.

4. A conveying apparatus according to claim 1, wherein said pins are disposed on said extruder cylinder and are disposed in respective planes, and wherein said pins are symmetrically distributed within said planes.

5. A conveying apparatus according to claim 4, wherein 4, 6 or 8 pins are disposed in each of said planes.

6. A conveying apparatus according to claim 1, wherein each of said pins has a circular cross-section, and wherein each of said pins has a length-to-diameter ratio of from 0.5 to 2, preferably approximately 1.

7. A conveying apparatus according to claim 1, wherein said pins extend through essentially the entire radial extension of said conveyor paths, and wherein said pins end just short, in particular approximately 5 to 10%, of a wall of said extruder housing, relative to a radial height of said conveyor paths.

8. A conveying apparatus according to claim 1, wherein a plurality, in particular 2 to 20, preferably 3 to 12, and especially preferably 4 to 8, planes of said pins are arranged in an axially successive manner.

9. A conveying apparatus according to claim 8, wherein an equal number of said pins is arranged on each of said planes, and wherein said pins in each of said planes are preferably oriented axially relative to one another.

10. A conveying apparatus according to claim 8, wherein an equal number of said pins is arranged on each of said planes of said pins, and wherein said pins are axially offset relative to one another.

11. A conveying apparatus according to claim 8, wherein the arrangement of said planes of said pins is such that said openings in said helical conveyor paths respectively have said pins pass through at different points in time.

12. A conveying apparatus according to claim 1, wherein said pins are arranged in a plurality of planes of said pins, and wherein at least two of said planes of said pins have different numbers of said pins.

13. A conveying apparatus according to claim 1, wherein each of said openings has a diameter, as viewed in a circumferential direction, that is 2 to 10%, preferably approximately 4%, greater than the diameter of a pertaining one of said pins.

14. A conveying apparatus according to claim 1, wherein each of said openings has two opening side walls that delimit conveyor ribs of said helical conveyor paths, and wherein said side walls extend parallel to a direction of rotation of said extruder cylinder.

15. A conveying apparatus according to claim 1, wherein planetary gears of said gear pump are disposed in a fixed manner and are adapted to be rotated by a sun wheel that is connected with said extruder cylinder so as to rotate therewith.

16. A conveying apparatus according to claim 15, wherein said sun wheel is monolithic with said extruder cylinder.

17. A conveying apparatus according to claim 1, wherein said gear pump is adapted to be driven separately from said extruder cylinder.

18. A conveying apparatus according to claim 1, wherein conveyor ribs of said extruder housing that are adjacent to said gear pump are flush with planetary gears of said gear pump.

19. A conveying apparatus according to claim 1, wherein said gear pump is provided with planetary gears, wherein said extruder housing is provided with conveyor ribs, and wherein the number of said planetary gears is an integral multiple of the number of said conveyor ribs.

20. A conveying apparatus according to claim 19, wherein the number of said planetary gears is the same as the number of said conveyor ribs.

* * * * *